United States Patent
Oji et al.

(12) 
(10) Patent No.: US 6,337,128 B1
(45) Date of Patent: Jan. 8, 2002

(54) PRESSURE-SENSITIVE ADHESION SHEETS FOR SILICONE OXIDE-CONTAINING MATERIAL

(75) Inventors: Katsunari Oji; Yoshinao Kitamura; Takao Yoshikawa, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/210,602

(22) Filed: Dec. 15, 1998

(30) Foreign Application Priority Data

Dec. 16, 1997 (JP) ............................................. 9-346124
Dec. 22, 1997 (JP) ............................................. 9-353102

(51) Int. Cl.$^7$ ................................................. B32B 7/12
(52) U.S. Cl. ................................. 428/317.7; 428/317.3; 428/355 AC
(58) Field of Search ........................... 428/317.3, 317.7, 428/355 AC

(56) References Cited

U.S. PATENT DOCUMENTS 5,318,835 A * 6/1994 Sawamoto et al. ...... 428/317.7

FOREIGN PATENT DOCUMENTS

JP 05140523 6/1993
JP 06200225 7/1994

OTHER PUBLICATIONS

Full text translation of JP 6–200225–A.*
Derwent–Acc–No: 1994–269662, Abstract for JP 06–200225 A, Jul. 1994.

* cited by examiner

Primary Examiner—Blaine Copenheaver
Assistant Examiner—Leanna Roche
(74) Attorney, Agent, or Firm—Morgan, Lewis & Bockius LLP

(57) ABSTRACT

The present invention provides a pressure-sensitive adhesion sheet being excellent in moisture and heat resistance and having a high adhesion to inorganic materials such as glass and tile, particularly a high adhesion even under high temperature and high humidity conditions, without using a silane coupling agent. The pressure-sensitive adhesion sheet for a silicone oxide-containing material comprises a base material having formed on at least one surface thereof a layer composed of an acrylic pressure-sensitive adhesive, wherein the base material is selected from a foamed base material having a water absorption rate less than 15% by weight after having been immersed in warm water having a temperature of 40° C. for 24 hours and a plastic film having a water vapor permeability of 500 g or less/m$^2$/24 hours, and the acrylic pressure-sensitive adhesive to be used in combination with the base material selected is specified.

4 Claims, No Drawings

PRESSURE-SENSITIVE ADHESION SHEETS FOR SILICONE OXIDE-CONTAINING MATERIAL

FIELD OF THE INVENTION

The present invention relates to a pressure-sensitive adhesion sheet for a silicone oxide-containing material, wherein an inorganic material comprising $SiO_2$ such as glass or tile is used as an adherend.

BACKGROUND OF THE INVENTION

In order to simplify workability or to improve safety and sanitation, an adhesion treatment using a pressure-sensitive adhesion tape instead of a conventional liquid adhesive is gradually currently used. With expanding the use of the pressure-sensitive adhesion tape, demanded properties are becoming hard. Of these demanded properties, as a practical property, moisture and heat resistance can be mentioned. In any use for household appliances, office appliances and automobiles, influences from temperature or humidity cannot be avoided. In particular, in such a circumstance as a surrounding of a bath, an influence from humidity is stronger than from temperature. However, conventionally currently used acrylic pressure-sensitive adhesives do not have sufficient moisture and resistance to an inorganic material mainly comprising $SiO_2$ such as glass or tile so that the adhesives lose their adhesion under high temperature and high humidity conditions, which may result in the detachment of a fixed member.

For the purpose of improving adhesion to glass, a method wherein a glass surface has been preliminary subjected to a silane-coupling treatment is commonly used. Further, is also disclosed a method wherein a silane-coupling agent is blended with an acrylic pressure-sensitive adhesive (refer to JP-B-62-30233) (The term "JP-B" as used herein means an "examined Japanese patent publication"). However, the former method requires a drying treatment at a high temperature and costly facilities, and also takes time. Further, the method is difficult to be applied to constructed glass windows. The latter method has severe restrictions in storage humidity conditions and storage term because of a short pot life of an alkoxysilane in a silane coupling agent. Thus, both methods are lacking of practical utility.

Further, in the pressure-sensitive adhesive tape, in order to reduce or disperse external force or vibration exerted on a member fixed by adhesion, or for improving follow-up property of the tape to the rough surface of the member, it has been well-known to use a foamed base material such as urethane, polyethylene or acrylfoam. Also in such a kind of double side pressure-sensitive adhesion sheet, if it is subjected to a circumstance of high temperature and high humidity, moisture permeates into a foamed base material and the permeated water penetrates into a glass interface from the back side of the pressure-sensitive adhesive layer so that the decrease in adhesion may occur. Even if a pressure-sensitive adhesive having an improved moisture resistance, the penetration of water from a foamed base material cannot be prevented so that the decrease in adhesion occurs as well.

It can be currently seen that a film or a label having a pressure-resistant adhesive layer is adhered to a glass plate or a container. For example, for imparting a design property to a window glass of a store, a print film having a pressure-sensitive adhesive layer is adhered. Further, a film for reflection prevention/light-screening or a film for preventing glass from scattering, each having a pressure-sensitive adhesive layer, is adhered to a window glass of a building. Still further, a reflection prevention film is adhered to a picture ray tube of a television installed outdoors or to a glass panel of a liquid crystal panel plasma display.

A pressure-sensitive adhesive used in these films is required to have excellent weather resistance and heat resistance. Further, since it is often subjected to rain or moisture condensation, it is also required to have water resistance and moisture resistance. Still further, in addition to the above-described films to be adhered to a window glass, for imparting a design property to a plain tile in a bathroom, a print film having a pressure-sensitive adhesive layer sometimes required to be adhered. Such kind of film, however, is to be subjected to a hot water and a high humidity, a pressure-sensitive adhesive having excellent moisture and heat resistance is required.

As a pressure-sensitive adhesive for these various kinds of films, acrylic pressure-sensitive adhesives having excellent weather resistance and heat resistance have been conventionally used. However, acrylic pressure-sensitive adhesives do not have sufficient moisture and heat resistance with respect to inorganic materials comprising $SiO_2$ as main components such as glass and tile. Therefore, when it is subjected to moisture and heat after being adhered to a film, such problemsmayoccur that the film is floated to form creases or to cause peeling.

In order to improve adhesion to a glass, has been currently used a method wherein the glass surface is previously subjected to a silane-coupling treatment. A method wherein a silane coupling agent is blended in an acrylic pressure-sensitive adhesive (JP-B-62-30233) was also disclosed. However, the former method requires a drying treatment at a high temperature and costly facilities, and also takes time. Further, the method is difficult to be applied to already constructed glass windows. The latter method has severe restrictions in storage humidity conditions and storage term because of a short pot life of an alkoxysilane in a silane coupling agent. Thus, both methods are lacking of practical utility.

As described in the above, in the prior art, have not been known practical pressure-sensitive adhesion sheets having excellent moisture and heat resistance for inorganic materials such as glass and tile. A foamed base material was used particularly for reducing or dispersing external force or vibration, or for improving follow-up property to the rough surface of a member. Those having excellent above-described properties can be scarcely found.

Thus, in the prior art, a practical film having a pressure-sensitive adhesive layer excellent in moisture and heat resistance for inorganic materials such as glass and tile has been scarcely known.

SUMMARY OF THE INVENTION

Under the above-described circumstances, an object of the present invention is to provide practical pressure-sensitive adhesion sheets having a high adhesion to inorganic materials such as glass and tile without using a silane coupling agent, and particularly those having excellent moisture and heat resistance, i.e., a high adhesion even under high temperature and high humidity conditions.

The object can be achieved by a first pressure-sensitive adhesion sheet for a silicone oxide-containing material, which comprises a foamed base material having formed on at least one surface thereof a layer composed of an acrylic pressure-sensitive adhesive comprising a copolymer comprising:

a) 60 to 94% by weight of an acrylic monomer represented by formula (1): $CH_2=C(R^1)COOR$ wherein $R^1$ is a hydrogen atom or a methyl group; and $R^2$ is an alkyl group having 4 to 14 carbon atoms, b) 5 to 40% weight of a (meth)acrylamide represented by formula (2): $CH_2=C(R^3)CONR^4 R^5$ wherein $R^3$ is a hydrogen atom or a methyl group; $R^4$ is a hydrogen atom or an alkyl group; and $R^5$ is an alkyl group or an organic group which is bonded to $R^4$ to form a hetero ring together with a N atom, and c) 1 to 10% by weight of a monomer having an acidic group, each based on the total content of components a), b) and c), wherein the foamed base material has a water absorption rate less than 15%, by weight after having been immersed in warm water having a temperature of 40° C. for 24 hours.

Furthermore, the object can be achieved by a second pressure-sensitive adhesion sheet for a silicone oxide-containing material, which comprises a plastic film formed on at least one surface thereof a layer composed of an acrylic pressure-sensitive adhesive comprising a copolymer comprising:

a) 60 to 95% by weight of an acrylic monomer represented by formula (1): $CH_2=C(R^1)COOR^3$ wherein $R^1$ is a hydrogen atom or a methyl group; and $R^2$ is an alkyl group having 4 to 12 carbon atoms), b) 5 to 40%, by weight of a N,N-disubstituted (meth)acrylamide represented by formula (2): $CH_2=C(R^3)CONR^4R^5$ wherein $R^3$ is a hydrogen atom or a methyl group; $R^4$ and $R^5$ are alkyl groups or organic groups which are bonded to each other to form a hetero ring together with a N atom, and c) 0 to 10% by weight of a monomer having an acidic group, each based on the total content of components a), b) and c), wherein the plastic film has a water vapor permeability of 500 g or less/m²/24 hours.

DETAILED DESCRIPTION OF THE INVENTION

In the earnest investigation for achieving the above-described object, firstly, regarding the decrease in the adhesion of the conventional acrylic pressure-sensitive adhesive to glass, particularly, regarding the fact that such phenomenon is noticeable under high humidity conditions, the following consideration was made: It is well known that $SiO_2$ which is a main component of glass is acidic in its surface. In general, conventional acrylic pressure-sensitive adhesives mainly comprise a copolymer of an acrylic monomer and a monomer having an acidic group and, therefore, is also acidic as an adhesive. For this reason, electrical repulsion between these acidic groups is exerted on the pressure-sensitive adhesive and the glass so that strong adhesion cannot be achieved. Especially, when water is present, dissociated ions of acidic groups are increased so that electrical repulsion is further exerted and, at the same time, the cohesive force is decreased due to water absorption. As the result, the adhesion lowers.

On the basis of the above consideration, the present inventors continued investigation considering that the above-described problems could be solved by controlling the penetration of water from this foamed base material to a pressure-sensitive adhesive layer and introducing a basic segment into the composition of a pressure-sensitive adhesive in the case where a foamed base material is used for a pressure-sensitive adhesion sheet in order to reduce or disperse external force or vibration or improve follow-up property to the rough surface of an adherend.

As a result, it was found that an excellent adhesion can be obtained, even if a silane coupling agent treatment was not applied to a silicone oxide-containing material such as glass or tile, by adopting a foamed base material having a specific water absorption and introducing a specific basic segment into an acrylic pressure-sensitive adhesive, whereby a heat-sensitive adhesion sheet being excellent in moisture and heat resistance, i.e., having a high adhesion even under high temperature and high humidity conditions can be obtained.

Furthermore, the present inventors considered that the above-described problems could be solved by controlling the penetration of water to the pressure-sensitive adhesive layer of the pressure-sensitive adhesion sheet and introducing a basic segment into the composition of the pressure-sensitive adhesive. As a result, it was found that an excellent adhesion can be obtained, even if a silane coupling agent treatment was not applied to a silicone oxide-containing material such as glass or tile, by adopting using a plastic film having a specific water vapor permeability as a base material and introducing a specific basic segment into an acrylic pressure-sensitive adhesive to be provided on the film, whereby a heat-sensitive adhesion sheet being excellent in moisture and heat resistance, i.e., having a high adhesion to a silicone oxide-containing material such as glass or tile, even under high temperature and high humidity conditions, can be obtained.

Namely, the first invention resides in pressure-sensitive adhesion sheets for a silicone oxide-containing material comprising on at least one surface of a foamed base material having an absorption less than 15%, by weight after having been immersed in warm water having a temperature of 40° C. for 24 hours is formed a layer composed of an acrylic pressure-sensitive adhesive mainly comprising a copolymer comprising a) 60 to 94% by weight of an acrylic monomer represented by formula (1): $CH_2=C(R^1)COOR^2$ (in the formula, $R^1$ is a hydrogen atom or a methyl group; and $R^2$ is an alkyl group having 4 to 14 carbon atoms), b) 5 to 40% by weight of a (meth)acrylamide represented by formula (2): $CH_2=C(R^3)CONR^4 R^5$ (in the formula, $R^3$ is a hydrogen atom or a methyl group; $R^4$ is a hydrogen atom or an alkyl group; and $R^5$ is an alkyl group or an organic group which is bonded to $R^4$ to form a hetero ring together with a N atom), and c) 1 to 10% by weight of a monomer having an acidic group, based on the total amount of components a), b) and c).

The foamed base material to be used in the present invention should have a water absorption less than 15% by weight, preferably less than 10% by weight after having been immersed in a hot water having a temperature of 40° C. for 24 hours. Any foamed base material can be used not depending on the constituting material and thickness. However, as the main component for the constituting material, butyl rubber, chloroprene rubber, urethane, polyethylene, acryl, epichlorohydrin rubber, and silicone rubber can be preferably used. If the thickness of the base material is too thick, the foamed base material may be deformed by a load when a member is fixed, and forced out from the member to deteriorate the appearance of a product (design property). If it is too thin, the follow-up property to a rough surface may be lost. In terms of these points, the thickness of the foamed base material is preferably from 0.5 to 2 mm.

When the above-described water absorption is 15% by weight or more, the movement of water from the foamed base material to the pressure-sensitive adhesive layer cannot be suppressed so that the decrease in moisture and heat resistance may occur. The means for making the above-described water-absorption of the foamed base material less than 15%, by weight is arbitrarily selected. For example, a kind or an amount of various additives to be included in the base material is selected and the production conditions are arbitrarily determined, whereby the water-absorption can be readily realized. The commercially available products having such water-absorption can be readily obtained, which can be used as they are.

The acrylic pressure-sensitive adhesive used in the present invention is one mainly comprising a copolymer comprising a) 60 to 94% by weight of an acrylic monomer represented by formula (1): $CH_2=C(R^1)COOR^2$ (in the formula, $R^1$ is a hydrogen atom or a methyl group; and $R^2$ is an alkyl group having 4 to 14 carbon atoms), b) 5 to 40% by weight of a (meth)acrylamide represented by formula (2): $CH_2=C(R^3)CONR^4\ R^5$ (in the formula, $R^3$ is a hydrogen atom or a methyl group; $R^4$ is a hydrogen atom or an alkyl group (preferably those having 1 to 5 carbon atoms); and $R^5$ is an alkyl group (preferably those having 1 to 5 carbon atoms) or an organic group which is bonded to $R^4$ to form a hetero ring together with a N atom), and c) 1 to 10% by weight of a monomer having an acidic group, based on the total amount of components a), b) and c).

The acrylic monomer of the component (a) is an alkyl ester of acrylic acid or methacrylic acid represented by formula (1) wherein $R^1$ is an alkyl group having 4 to 14 carbon atoms such as a butyl, isobutyl, isoamyl, hexyl, heptyl, 2-ethylhexyl, isooctyl, isononyl, and isodecyl group. When the carbon number of $R^2$ is less than 4, wetting of the pressure-sensitive adhesive decreases and initial adhesion is poor. If it exceeds 14, the adhesion would be deteriorated. The acrylic monomer of the component (a) is used in an amount of 60 to 94% by weight of the total monomers and can be used a lone or in any mixture thereof. If the acrylic monomer is used in an amount less than 60% by weight, the resulting adhesive is difficult to exhibit its performance as the acrylic pressure-sensitive adhesive. The use of the acrylic monomer in an amount exceeding 94% by weight results in an insufficient amount of the (meth)acrylamide of the component (b), thereby causing insufficient adhesion performance to glass.

(Meth)acrylamides of the component (b) include non-cyclic (meth)acrylamides such as N-monosubstituted (meth)acrylamides and N,N-disubstituted (meth)acrylamides, and cyclic (meth) acrylamides, which are represented by formula (2). As the examples of these non-cyclic and cyclic (meth) acrylamides, mention may be made of N-methylacrylamide, N,N-dimethylacrylamide, N-isopropylacrylamide, N,N-diethyl(meth)acrylamide, N,N-dibutyl(meth)acrylamide, N-(meth)acryloylmorpholine, N-(meth)acryloylpyrrolidone, N-(meth)acryloylpiperidine, N-(meth)acryloylpyrrolidine, N-(meth)acryloyl-4-peperidone. The component (b) is generally used in an amount of 5 to 40% by weight, preferably 10 to 35% by weight of the total monomers and can be used alone or in any mixture thereof. When the component (b) is used in an amount less than 5% by weight, the resulting adhesive is liable to have an insufficient adhesion ability to glass. On the other hand, when the amount exceeds 40% by weight, elastic modulus of the resulting adhesive is liable to increase so that wetting thereof at room temperature lowers.

As monomer having an acidic group of component (c), are used carboxyl-containing monomers such as acrylic acid, methacrylic acid, itaconic acid, and crotonic acid; and phosphoric group-containing monomers such as 2-hydroxyethylacryloyl phosphate and 2-hydroxypropylacryloyl phosphate. The monomer of the component (c) is generally used in an amount of 1 to 10% by weight, preferably 2 to 8% by weight of the total monomers and can be used alone or in any mixture thereof. When an amount of the component (c) is less than 1% by weight, the resulting adhesive has an insufficient cohesive force to have a decreased thermal resistance retaining ability. On the other hand, when it exceeds 10% by weight, since an amount of an acid component in the adhesive increases, the adhesion ability to glass is deteriorated, which may readily cause the de crease in the adhesion a round room temperature.

The copolymer can be obtained by copolymerizing a monomer mixture comprising the above-described components (a), (b) and (c) according to a conventional method such as solution polymerization method, emulsion polymerization method, bulk polymerization method or a suspension polymerization method. In the bulk polymerization method, a polymerization system by means of irradiation of ultra-violet rays is preferable. In the copolymerization, photo-polymerization initiators and heat-polymerization initiators, e.g., organic peroxides such as benzoyl peroxide, lauryl peroxide and cumene peroxide; azo compounds such as 2,2'-azobisisobytyronitrile and 2,2'-azobis (2,4-dimethylvaleronitrile); acetophenone compounds such as 2,2'-dimethoxy-2-phenylacetophenone and 2,2'-diethoxyacetophenone; benzoin ether compounds such as benzoin ethyl ether and benzoin isopropyl ether; and benzophenone compounds such as benzophenone and benzoyl benzoate are used. The copolymer preferably has a weight-average molecular weight of 100,000 to 1,000,000.

The acrylic pressure-sensitive adhesive of the present invention comprises such copolymers as a main component. It is usual to incorporate an arbitrary crosslinking agent in the adhesive and effect a crosslinking treatment (for example, with irradiation of actinic light such as electron rays) to provide an acrylic pressure-sensitive adhesive having an excellent heat resistance retaining property.

The amount of the crosslinking agent is generally from 0.01 to 5 parts by weight per 100 parts by weight of the copolymer. Examples of the crosslinking agent include known various polyfunctional compounds such as polyisocyanate compounds, polyepoxy compounds and aziridine compounds, with polyisocyanates compounds being preferred. As the polyisocyanates compounds, mention may be made of aliphatic polyisocyanates such as ethylene diisocyanate, butylene diisocyanate, and hexamethylene diisocyanate; alicyclic polyisocyanates such as cyclopentylene diisocyanate, cyclohexylene diisocyanate, and isophorone diisocyanate; aromatic polyisocyanates such as 2,4-tolylene diisocyanate, 4,4' diphenylmethane diisocyanate and xylylene diisocyanate; and tolylene diisocyanate adducts of trimethylol propane.

In the above-described copolymerization, instead of the above-described crosslinking agents, internal crosslinking agents can be added to provide a pressure-sensitive adhesive having an excellent heat resistance retaining property as in the above. As such internal crosslinking agents, mention may be made of polyfunctional (meth)acrylates such as trimethylolpropane tri(meth)acrylate, pentaerythritol tetra (meth)acrylate, 1,2-ethylene glycol di(meth)acrylate, 1,6-hexanediol di(meth)acrylate, and 1,12-dodecanediol di(meth)acrylate.

The acrylic pressure-sensitive adhesive of the present invention contains the copolymer as the main component in an amount of 50 to 99.9% by weight. In addition to the above-described components, the acrylic pressure-sensitive adhesive may contain known various additives such as an adhesion-imparting resin, an aging prevention agent, an ultraviolet absorber, a colorant, a filler, a flame retardant and an antistatic agent, if desired. These additives are used in an ordinary amount depending on their kinds.

In accordance with the present invention, a layer composed of the specified pressure-sensitive adhesive is formed on at least one surface of a foamed base material having the above-described specified water absorption to produce a pressure-sensitive adhesion sheet in the form of a sheet or a film. The thickness of the layer is not particularly limited, but is generally from about 5 to 200 μm with respect to one layer which may be formed on each side. When the layer is provided on only one surface of the foamed base material, a layer comprising a general pressure-sensitive adhesive excellent in anchor effect with the base material, such as rubber-type, acrylic-type or silicone-type adhesive, can be provided on the other surface.

The pressure-sensitive adhesion sheets of the present invention can have an excellent adhesion to an adherend comprising an inorganic material mainly comprising $SiO_2$ such as glass and tile by having a layer comprising the above-described specified acrylic pressure-sensitive adhesive as the adhesion interface, and, particularly, can have sufficient moisture and heat resistance so that they may have a high adhesion even under high temperature and high humidity conditions. Thus, the pressure-sensitive adhesion sheets of the present invention are extremely suitable for silicone oxide-containing materials.

The second invention resides in pressure-sensitive adhesion sheets for silicone oxide-containing materials comprising on at least one surface of a plastic film having water vapor permeability of 500 g or less/m$^2$/24 hours is formed a layer composed of an acrylic pressure-sensitive adhesive mainly comprising a copolymer comprising a) 60 to 95% by weight of an acrylic monomer represented by formula (1): $CH_2=C(R^1)COOR^2$ (in the formula, $R^1$ is a hydrogen atom or a methyl group; and $R^2$ is an alkyl group having 4 to 12 carbon atoms) , b) 5 to 40% by weight of a N,N-disubstituted (meth)acrylamide represented by formula (2): $CH_2=C(R^3)CONR^4 R^5$ (in the formula, $R^3$ is a hydrogen atom or a methyl group; $R^4$ and $R^5$ are alkyl groups or organic groups which are bonded to each other to form a hetero ring together with a N atom), and c) 0 to 10%, by weight of a monomer having an acidic group, based on the total amount of components a), b) and c). A pressure-sensitive adhesion sheets for a silicone oxide-containing material having the above-described construction wherein a gel percentage of the copolymer component contained in the layer comprising the acrylic pressure-sensitive adhesive is 50 to 95% by weight is particularly preferred.

A plastic film to be used as a base material in the present invention can be one having a water vapor permeability (according to JIS Z-0208 method) of 500 g or less/m$^2$/24 hours. The material and the thickness thereof are not particularly limited. However, such plastic film is often required to have transparency and smoothness depending upon a use thereof. In view of these requirements, generally, a polyester film or a polycarbonate film having a thickness of 6 to 250 μm is suitable. When the water vapor permeability is higher than 500 g /m$^2$/24 hours, the acrylic pressure-sensitive adhesive is to have an increased water absorption under high humidity conditions, which is liable to result in the decrease in the cohesive force and the interface adhesion with glass.

The acrylic pressure-sensitive adhesive used in the present invention is one mainly comprising a copolymer comprising a) 60 to 95%, by weight of an acrylic monomer represented by formula (1): $CH_2=C(R^1)COOR^2$ (in the formula, $R^1$ is a hydrogen atom or a methyl group; and $R^2$ is an alkyl group having 4 to 12 carbon atoms), b) 5 to 40% by weight of a N,N-disubstituted (meth)acrylamide represented by formula (2): $CH_2=C(R^3)CONR^4 R^5$ (in the formula, $R^3$ is a hydrogen atom or a methyl group; $R^4$and $R^5$ are alkyl groups (preferably those having 1 to 5 carbon atoms) or organic groups which are bonded to each other to form a hetero ring together with a N atom), and c) 0 to 10% by weight of a monomer having an acidic group.

As the acrylic monomers of the component (a), mention may be made of butyl(meth)acrylate, isobutyl(meth) acrylate, isoamyl(meth)acrylate, hexyl(meth)acrylate, heptyl(meth)acrylate, 2-ethylhexyl(meth)acrylate, isooctyl (meth)acrylate, isononyl(meth)acrylate, and isodecyl(meth) acrylate. When the carbon number of $R^2$ in formula (1) is less than 4, wetting of the pressure-sensitive adhesive decreases and initial adhesion is poor. On the other hand, when it exceeds 12, the adhesion is deteriorated. The acrylic monomer of the component (a) is used in an amount of 60 to 95% by weight of the total monomers and can be used alone or in a mixture of two or more thereof. When the acrylic monomer is used in an amount less than 60% by weight, the resulting adhesive is difficult to exhibit its performance as the acrylic pressure-sensitive adhesive. On the other hand, the use of the amount of the acrylic monomer of exceeding 95% by weight results in an insufficient amount of N,N-disubstituted (meth)acrylamide of the component (b) so that the adhesion performance to glass becomes insufficient.

The N,N-disubstituted (meth) acrylamide of the component (b) is an essential monomer component for developing a strong adhesion to glass, and include a non-cyclic (meth) acrylamide represented by formula (2) wherein $R^4$ and $R^5$ are alkyl groups, and a cyclic (meth)acrylamide represented by formula (2) wherein $R^4$ and $R^5$ are bonded to each other to form a hetero ring together with a N atom. As the N,N-disubstituted (meth)acrylamides, the non-cyclic (meth) acrylamides and/or cyclic (meth)acrylamides is (are) used. As the examples of these non-cyclic (meth)acrylamides, mention may be made of N,N-dimethyl(meth)acrylamide, N,N-diethyl(meth)acrylamide, and N,N-dibutyl(meth) acrylamide. As the examples of the above-described cyclic (meth) acrylamides, mention may be made of N-(meth) acryloylmorpholine, N-(meth) acryloylpyrrolidone, N-(meth)acryloylpiperidine, N-(meth) acryloylpyrrolidine, and N-(meth)acryloyl-4-peperidone. N,N-disubstituted (meth)acrylamides of the component (b) are used in an amount of 5 to 40% by weight, preferably 10 to 35% by weight of the total monomers and can be used alone or in any mixture thereof. When the component (b) is used in an amount of less than 5% by weight, the resulting adhesive is liable to have an insufficient adhesion performance to glass. When the amount exceeds 40% by weight, elastic modulus of the resulting adhesive increases, and the wetting to an adherend is reduced.

As monomers having an acidic group of component (c), are used carboxyl-containing monomers such as acrylic acid, methacrylic acid, itaconic acid, maleic acid and crotonic acid; and phsphoric group-containing monomers such as 2-hydroxyethylacryloyl phosphate and 2-hydroxypropylacryloyl phosphate. The monomer having an acidic group of component (c) is optionally used for controlling the cohesive force of the pressure-sensitive adhesive. Namely, it is used in an amount of 0 to 10% by weight , preferably 2 to 8% by weight of the total monomers and can be used alone or in a mixture thereof. When an amount of the component (c) exceeds 10% by weight, an amount of an acid component in the ad hesive increases, and the moisture-resistant adhesion to glass is decreased.

The copolymer can be obtained by copolymerizing a monomer mixture comprising the above-described components (a) and (b) or a monomer mixture comprising the above-described components (a), (b) and (c), according to a conventional method such as solution polymerization method, emulsion polymerization method, bulk polymerization method or a suspension polymerization method. In the bulk polymerization method, a polymerization system by means of irradiation of ultraviolet rays is preferable. In the copolymerization, photo-polymerization initiators and heat-polymerization initiators, e.g., organic peroxides such as benzoyl peroxide, lauryl peroxide and cumene peroxide; azo compounds such as 2,2'-azobisisobytyronitrile and 2,2'-azobis(2,4-dimethylvaleronitrile; acetophenone compounds such as 2,2-dimethoxy-2-phenylacetophenone and 2,2-diethoxyacetophenone; benzoin ether compounds such as benzoin ethyl ether and benzoin isopropyl ether; and benzophenone compounds such as benzophenone and benzoyl benzoate are used. The copolymer preferably has a weight-average molecular weight of 100,000 to 1,000,000.

In the acrylic pressure-sensitive adhesive of the present invention, the gel percentage of the copolymer is generally from 50 to 95% by weight, preferably from 55 to 90% by weight. When the gel percentage is less than 50% by weight, the cohesive force of the adhesive is decreased due to the water absorption under high humidity conditions, which may readily invite the decrease in adhesion. When it exceeds 95% by weight, sol proportion becomes too small and the wetting property to glass is deteriorated, thereby failing to exhibit high adhesion.

The gel percentage can be obtained as follows. About 0.1 g of a sample (i.e., the copolymer to be measured) is weighed accurately (weight (A)), then immersed in ethyl acetate (or toluene), washed in an ultrasonic washer for 40 minutes, allowed to stand for 10 minutes, and dried at 130° C. for 2 hours. The remaining solids are weighed accurately (weight (B)). The gel percentage can be calculated according to the following equation: (weight(B)/weight(A))×100(%).

The above-described gel percentage can be readily realized by controlling a kind and an amount of an external crosslinking agent or an internal crosslinking agent.

As the external crosslinking agents, mention may be made polyfunctional isocyante compounds such as ethylene diisocyanate, butylene diisocyanate, hexamethylene diisocyanate, cyclopentylene diisocyanate, cyclohexylene diisocyanate, isophorone diisocyanate, 2,4-tolylene diisocyanate, 4,4'-diphenylmethane diisocyanate, xylylene diisocyanate and tolylene diisocyanate adducts of trimethylol propane. As the internal crosslinking agents, mention may be made of polyfunctional (meth)acrylates such as trimethylolpropane tri(meth)acrylate, pentaerythritol tetra (meth)acrylate, 1,2-ethylene glycol di(meth)acrylate, 1,6-hexanediol di(meth)acrylate, and 1,12-dodecanediol di(meth)acrylate. These internal crosslinking agents are usually added during the synthesis of the copolymer The second acrylic pressure-sensitive adhesive contains the copolymer component having been subjected to such crosslinking treatment as the main component, generally in an amount of 50 to 99.9% by weight. Furthermore, the acrylic pressure-sensitive adhesive may contain known various additives such as an adhesion-imparting resin, an antioxidant, an ultraviolet absorber, a colorant, a filler, a flame retardant and an antistatic agent. These additives can be used in an ordinary amount corresponding to their kinds.

The pressure-sensitive adhesion sheets of the present invention have such a construction that the plastic film having the specific water vapor permeability is used as the base material and a layer composed of the specified acrylic pressure-sensitive adhesive is formed on at least one surface of the film to provide a pressure-sensitive adhesion sheet in the form of a sheet or a film. The thickness of the layer composed of the pressure-sensitive adhesive is not particularly limited. Generally, the film has a layer having a thickness of from about 5 to 200 $\mu$per one side.

The pressure-sensitive adhesion sheets of the present invention can have an excellent adhesion to an adherend comprising an inorganic material comprising $SiO_2$ such as glass and tile as a main component, and, particularly, can have sufficient moisture and heat resistance such that they have a high adhesion even under high temperature and high humidity conditions. Thus, the pressure-sensitive adhesion sheets of the present invention can be widely used as practically useful pressure-sensitive adhesion sheets for silicone oxide-containing materials.

The present invention will be further specifically described by way of, but by no means limited to, following Examples. In the Examples, all parts are by weight.

REFERENCE EXAMPLE 1-1

Seventy-nine parts of isononyl acrylate, 14 parts of acryloyl morpholine, 7 parts of acrylic acid, and 0.07 part of 2,2-dimethoxy-2-phenylacetophenone as a photopolymerization initiator were charged into a reactor equipped with a cooling pipe, a nitrogen inlet pipe, a thermometer, an ultraviolet radiation unit and a stirrer, and then photopolymerization was effected to obtain a polymer-monomer mixture having a polymerization rate of 15% by weight. Then, 0.1 part of trimethylolpropane triacrylate was added based on 100 parts of the solid components of the mixture to obtain a syrup. The syrup was coated on a polyester film having thickness of 25 $\mu$m, which had been subjected to a releasing treatment, in such an amount that the coat had a thickness of 50 $\mu$m after curing. Then, the coat was cured by irradiation with ultraviolet rays. Thus, a layer comprising an acrylic pressure-sensitive adhesive was formed.

REFERENCE EXAMPLE 1-2

Eighty-five parts of 2-ethylhexyl acrylate, 15 parts of acrylic acid, and 14 parts of 2,2-azobisisobutyronitrile as a polymerization initiator were charged into a reactor equipped with a cooling pipe, a nitrogen inlet pipe, a thermometer and a stirrer. Further, 100 parts of ethyl acetate were added based on 100 parts of the solid components of the resulting mixture. Successively, the mixture obtained was reacted at 60° C. for 12 hours to obtain a polymer solution. Then, 1 part of a tolylene diisocyanate adduct of trimethylolpropane ("Coronate L" manufactured by Nippon Polyurethane Industry Co., Ltd.) was added based on 100 parts of the solid components of the mixture to form a pressure-sensitive adhesive solution. The pressure-sensitive adhesive solution was coated on a polyester film having a thickness of 25 $\mu$m, which had been subjected to a releasing treatment, in such an amount that the coat had a thickness of 50 $\mu$m after drying, followed by drying. Thus, a layer comprising the acrylic pressure-sensitive adhesive was formed.

REFERENCE EXAMPLE 1-3

One hundred parts of epichlorohydrin-ethylneoxide-acryldiglycidyl ether terpolymer (Epichlomer CG manufactured by DAISO Co., Ltd.), 30 parts of calcium carbonate, 30 parts of carbon black, 0.7 part of 2-mercaptoimidazoline, 3 parts of a urea type foaming agent, 3 parts of N,N'-dinitropentamethylene tetramine, 3 parts of 2,2,4-trimethyl-1,2-dihydroquinoline polymer, and 1 part of stearic acid were compounded to prepare a composition. The composition was kneaded by a mixing roll and then rolled to form a sheet having a thickness of 0.6 mm. Then, the sheet was heated at 160° C. for 10 minutes to effect vulcanization and expansion. Thus, a foamed base material having a thickness of 0.8 mm was obtained.

The foamed base material had a water absorption of 10% by weight after having been immersed in a hot water of 40° C. for 24 hours. The water absorption was determined as set forth below: A 100 mm square foamed base material was immersed in a hot water having a temperature of 40° C. for 24 hours, then the weight of the foamed base material before and after the immersion were measured. The water absorption was calculated according to the following equation; water absorption (% by weight)=[weight after immersion (g)/weight before immersion (g)]×100. All the water absorptions hereinafter described were measured and calculated in the same manner as above.

REFERENCE EXAMPLE 1-4

A foamed base material having a thickness of 0.8 mm was obtained by effecting sheet-forming, heating and foaming in the same manner as in Reference Example 1-3 except that 30 parts of white carbon 30 parts were added in the composition instead of 30 parts of carbon black. The foamed base material had a water absorption of 35% by weight.

EXAMPLE 1-1

A layer composed of the acrylic pressure-sensitive adhesive obtained in Reference Example 1-1 was laminated onto one surface of the foamed base material having a thickness of 0.8 mm and a water absorption of 10% by weight to thereby form a pressure-sensitive adhesion sheet.

EXAMPLE 1-2

A layer composed of the acrylic pressure-sensitive adhesive obtained in Reference Example 1-1 was laminated onto one surface of the foamed base material composed of commercially available polyethylene foam having a thickness of 0.8 mm and a water absorption of 5% by weight to thereby form a pressure-sensitive adhesion sheet.

COMPARATIVE EXAMPLE 1-1

A pressure-sensitive adhesion sheet was prepared in the same manner as in Example 1-1 except that the layer composed of the acrylic pressure-sensitive adhesive obtained in Reference Example 1-2 was used instead of the layer composed of the acrylic pressure-sensitive adhesive obtained in Reference Example 1-1.

COMPARATIVE EXAMPLE 1-2

A pressure-sensitive adhesion sheet was prepared in the same manner as in Example 1-2 except that the layer composed of the acrylic pressure-sensitive adhesive obtained in Reference Example 1-2 was laminated instead of the layer composed of the acrylic pressure-sensitive adhesive obtained in Reference Example 1-1.

COMPARATIVE EXAMPLE 1-3

A layer composed of the acrylic pressure-sensitive adhesive obtained in Reference Example 1-1 was laminated onto one surface of the foamed base material having a thickness of 0.8 mm and a water absorption of 35% by weight, obtained in Reference Example 1-4, to thereby form a pressure-sensitive adhesion sheet.

COMPARATIVE EXAMPLE 1-4

A layer composed of the acrylic pressure-sensitive adhesive obtained in Reference Example 1-1 was laminated onto one surface of the foamed base material composed of commercially available urethane foam, and having a thickness of 0.8 mm and a water absorption of 30% by weight to thereby form a pressure-sensitive adhesion sheet.

COMPARATIVE EXAMPLE 1-5

A layer composed of the acrylic pressure-sensitive adhesive obtained in Reference Example 1-1 was laminated onto one surface of the foamed base material composed of commercially available acryl foam and having a thickness of 0.8 mm and a water absorption of 25% by weight to thereby form a pressure-sensitive adhesion sheet.

The pressure-sensitive adhesion sheets of Example 1-1, 1-2 as well as Comparative Examples 1-1 to 1-5 were evaluated in terms of initial adhesion, adhesion after having been subjected to high temperature (after having been allowed to stand at 40° C. for 7 days) and adhesion after having been subjected to high temperature and high humidity conditions (after having been allowed to stand at 40° C. and 92% RH for 7 days) The obtained results are shown in Table 1-1 which will described below.

MEASUREMENT OF ADHESIVE STRENGTH

A pressure-sensitive adhesion sheet was cut into a size of 20 mm×100 mm, and a backing of a pressure-sensitive adhesion tape having commercially available polyethylene terephthalate film as a base material was applied to the pressure-sensitive adhesion sheet. Thereafter, the backing was contact-bonded with glass plate by reciprocating a roller having a weight of 2 kg thereon to prepare a test piece. The test piece thus obtained was allowed to stand under the following conditions (1) to (3), thereafter, 180° peel adhesive strength thereof were measured by means of a universal testing machine (rate: 50 mm/min.) at a temperature of 23° C. and a relative humidity of 65%.

(1) A test piece is allowed to stand in an atmosphere of 23° C. and 65% RH for 20 minutes (initial adhesion).

(2) After conducting the condition (1), the test piece is placed into a dryer having a temperature of 40° C. and kept therein for 7 days, is taken out and allowed to stand in an atmosphere of 23° C. and 65% RH for 20 minutes (adhesion after standing at a high temperature).

(3) After conducting the condition (1), the test piece is placed into a heating humidifier of 40° C. and 92% RH and kept therein for 7 days, taken out and allowed to stand in an atmosphere of 23° C. and 65% RH for 20 minutes (adhesion after standing at a high temperature and a high humidity).

TABLE 1-1

Adhesive Strength to Glass Plate (N/20 mm width)

|  | Initial Stage | After Standing at High Temp. | After Standing at High Temp. and High Humidity |
|---|---|---|---|
| Example 1-1 | 38.0 | 39.7 | 38.7 |
| Example 1-2 | 35.0 | 38.8 | 36.0 |
| Comparative Example 1-1 | 32.7 | 35.1 | 14.9 |
| Comparative Example 1-2 | 29.8 | 33.0 | 11.6 |
| Comparative Example 1-3 | 35.9 | 38.8 | 4.0 |
| Comparative Example 1-4 | 33.9 | 37.8 | 3.4 |
| Comparative Example 1-5 | 37.6 | 40.7 | 10.4 |

It can be seen from the results shown in Table 1-1 that the pressure-sensitive adhesive sheets of Examples 1-1 and 1-2 of the present invention had a high adhesion in an initial stage and after standing at a high temperature, and also had a very high adhesion after standing at a high temperature and high humidity. Thus, it can be seen that they are excellent in moisture and heat resistance. On the other hand, the pressure-sensitive adhesion sheets of Comparative Examples 1-1 to 1-5 exhibited a drastic decrease in the adhesion after standing at a high temperature and a high humidity, and there was a case causing an insufficient initial adhesion.

REFERENCE EXAMPLE 2-1

One hundred parts of a monomer mixture (composed of 75 parts by butyl acrylate, 20 parts of N,N-diethyl acrylamide and 5 parts of acrylic acid), 0.2 part of N,N'-azobisisobutyro-nitrile, and 200 parts of toluene were added in to a flask. Then, air in the flask was substituted with nitrogen, and the flask was heated to 60° C. At that temperature, stirring was effected for 20 hours to continue the copolymerization reaction. Thus, a copolymer solution A was obtained.

REFERENCE EXAMPLE 2-2

A copolymer solution B was obtained in the same manner as in Reference Example 2-1 except that the monomer mixture was changed to one composed of 50 parts of butyl acrylate, 45 parts of N,N-diethylacrylamide and 5 parts of acrylic acid.

REFERENCE EXAMPLE 2-3

A copolymer solution C was obtained in the same manner as in Reference Example 2-1 except that the monomer mixture was changed to one composed of 70 parts of butyl acrylate, 15 parts of N,N-diethylacrylamide and 15 parts of acrylic acid.

REFERENCE EXAMPLE 2-4

A copolymer solution D was obtained in the same manner as in Reference Example 2-1 except that the monomer mixture was changed to one composed of 92 parts of butyl acrylate and 8 parts of acrylic acid.

REFERENCE EXAMPLE 2-5

A mixed solution of a monomer mixture composed of 80 parts of isooctylacrylate, 15 parts of acryloylmorpholine and 5 parts of acrylic acid with 0.1 part of 2,2-dimethoxy-2-phenylacetophenone was exposed to ultraviolet rays in a nitrogen atmosphere to cause partial polymerization. As a result, a coatable syrup E having a viscosity of about 200 poise was obtained.

REFERENCE EXAMPLE 2-6

Coatable syrup E having a viscosity of about 200 poise was obtained by partial polymerization in the same manner as in Reference Example 2-5 except that the monomer mixture was changed to one composed of 80 parts of isooctyl acrylate and 20 parts of acryloyl morpholine.

EXAMPLE 2-1

A tolylene diisocyanate adduct of trimethylol propane was added to the copolymer solution A obtained in Reference Example 2-1 in an amount of 1.5 parts based on 100 parts of the copolymer contained in the copolymer solution A to thereby form an acrylic pressure-sensitive adhesion solution. The acrylic pressure-sensitive adhesion solution was coated on a polyethylene terephthalate film having a water vapor permeability of 28 g/m$^2$/24 hours and a thickness of 25 μm, followed by drying at 110° C. for 8 minutes. Thus, a pressure-sensitive adhesion sheet having a layer comprising the acrylic pressure-sensitive adhesive and having a thickness of 50 μ was formed. The gel percentage of the layer comprising the pressure-sensitive adhesive was 72% by weight.

EXAMPLE 2-2

A pressure-sensitive adhesion sheet having a layer comprising an acrylic pressure-sensitive adhesive and having a thickness of 50 μm was formed in the same manner as in Example 2-1 except that a polycarbonate film having a water vapor permeability of 60 g/m$^2$/24 hours and a thickness of 25 μm was used. The gel percentage of the layer comprising the pressure-sensitive adhesive was 72% by weight, which was the same as in Example 2-1.

EXAMPLE 2-3

Zero point zero eight part of trimethylol propane triacrylate was added into 100 parts of the Syrup E obtained in Reference Example 2-5 to thereby form a liquid mixture. The liquid mixture was coated on a polyethylene terephthalate film having a water vapor permeability of 28 g/m$^2$/24 hours and a thickness of 25 μm, and irradiated with ultraviolet rays at 900 mJ/cm$^2$ by means of a high pressure mercury vapor lamp having a light intensity of 5 mW/cm$^2$ in a nitrogen gas atmosphere to effect a photopolymerization treatment. Thus, a pressure-sensitive adhesion sheet having a layer comprising the acrylic pressure-sensitive adhesive and having a thickness of 50 μm was formed. The gel percentage of the layer comprising the pressure-sensitive adhesive was 68% by weight.

EXAMPLE 2-4

A pressure-sensitive adhesion sheet having a layer comprising an acrylic pressure-sensitive adhesive and having a thickness of 50 μm was formed in the same manner as in Example 2-3 except that the Syrup F obtained in Reference Example 2-6 was used instead of the Syrup E obtained in Reference Example 2-5. The gel percentage of the layer comprising the above-described pressure-sensitive adhesive was 62%, by weight.

EXAMPLE 2-5

A pressure-sensitive adhesion sheet having a layer comprising an acrylic pressure-sensitive adhesive and having a thickness of 50 µm was formed in the same manner as in Example 2-3 except that a stretched polypropylene film having a water vapor permeability of 8 g/m²/24 hours and a thickness of 25 µm (having been subjected to a corona treatment) was used as a base material. The gel percentage of the layer comprising the acrylic pressure-sensitive adhesive was 68% by weight, which was the same as in Example 2-3.

EXAMPLE 2-6

A pressure-sensitive adhesion sheet having a layer comprising an acrylic pressure-sensitive adhesive and having a thickness of 50 µm was formed in the same manner as in Example 2-3 except that the Syrup F obtained in Reference Example 2-6 was used instead of the Syrup E obtained in Reference Example 2-5, and a stretched polypropylene film having a water vapor permeability of 8 g/m²/24 hours and a thickness of 25 µm (having been subjected to a corona treatment) was used as abase material. The gel percentage of the layer comprising the pressure-sensitive adhesive was 62%) by weight.

EXAMPLE 2-7

A pressure-sensitive adhesion sheet having a layer comprising an acrylic pressure-sensitive adhesive and having a thickness of 50 µm was formed in the same manner as in Example 2-1 except that the tolylene diisocyanate adduct of trimethylol propane was added in an amount of 0.5 part. The gel percentage of the layer comprising the pressure-sensitive adhesive was 35% by weight.

EXAMPLE 2-8

A pressure-sensitive adhesion sheet having a layer comprising an acrylic pressure-sensitive adhesive and having a thickness of 50 µm was formed in the same manner as in Example 2-3 except that trimethylol propane triacrylate was added in an amount of 0.03 part and a stretched polypropylene film having a water vapor permeability of 8 g/m²/24 hours and a thickness of 25 µm (having been subjected to a corona treatment) was used as a base material. The gel percentage of the layer comprising the pressure-sensitive adhesive was 40% by weight.

COMPARATIVE EXAMPLE 2-1

A pressure-sensitive adhesion sheet having a layer comprising an acrylic pressure-sensitive adhesive and having a thickness of 50 µm was formed in the same manner as in Example 2-1 except that the copolymer solution B obtained in Reference Example 2-2 was used instead of the copolymer solution A obtained in Reference Example 2-1. The gel percentage of the layer comprising the pressure-sensitive adhesive was 82% by weight.

COMPARATIVE EXAMPLE 2-2

A pressure-sensitive adhesion sheet having a layer comprising an acrylic pressure-sensitive adhesive and having a thickness of 50 µm was formed in the same manner as in Example 2-1 except that the copolymer solution C obtained in Reference Example 2-3 was used in stead of the copolymer solution A obtained in Reference Example 2-1. The gel percentage of the layer comprising the pressure-sensitive adhesive was 84% by weight.

COMPARATIVE EXAMPLE 2-3

A pressure-sensitive adhesion sheet having a layer comprising an acrylic pressure-sensitive adhesive and having a thickness of 50 µm was formed in the same manner as in Example 2-1 except that the copolymer solution D obtained in Reference Example 2-4 was used instead of the copolymer solution A obtained in Reference Example 2-1. The gel percentage of the layer comprising the pressure-sensitive adhesive was 71% by weight.

COMPARATIVE EXAMPLE 2-4

A pressure-sensitive adhesion sheet having a layer comprising an acrylic pressure-sensitive adhesive and having a thickness of 50 µm was formed in the same manner as in Example 2-1 except that the copolymer solution D obtained in Reference Example 2-4 was used instead of the copolymer solution A obtained in Reference Example 2-1 and a polycarbonate film having a water vapor permeability of 60 g/m²/24 hours and a thickness of 25 µm was used as a base material. The gel percentage of the layer comprising the pressure-sensitive adhesive was 71% by weight.

COMPARATIVE EXAMPLE 2-5

A tolylene diisocyanate adduct of trimethylol propane was added to the copolymer solution A obtained in Referrence Example 2-1 in an amount of 1.5 parts based on 100 parts of the copolymer contained in the copolymer solution A to thereby form an acrylic pressure-sensitive adhesive solution. The acrylic pressure-sensitive adhesion solution was coated on a release paper, followed by drying at 110° C. for 8 minutes, to form a layer comprising the acrylic pressure-sensitive adhesive and having a thickness of 50 µ. Then, the resulting layer was laminated on a triacetate film having a thickness of 25 µm and a water vapor permeability of 700 g/m²/24 hours to form a pressure-sensitive adhesion sheet. The gel percentage of the layer comprising the pressure-sensitive adhesive was 72% by weight.

COMPARATIVE EXAMPLE 2-6

A pressure-sensitive adhesion sheet having a layer comprising an acrylic pressure-sensitive adhesive and having a thickness of 50 µwas formed in the same manner as in Comparative Example 2-5 except that the copolymer solution D obtained in Reference Example 2-4 was used instead of the copolymer solution A obtained in Reference Example 2-1. The gel percentage of the layer comprising the pressure-sensitive adhesive was 71% by weight.

The pressure-sensitive adhesion sheets of Examples 2-1 to 2-8 as well as Comparative Examples 2-1 to 2-6 were evaluated in terms of initial adhesion, adhesion after having been subjected to high temperature (after standing at 40° C. for 7 days) and adhesion after having been subjected to high temperature and high humidity conditions (after standing at 40° C. and 92% RH for 7 days). The obtained results are shown in Table 2-1.

MEASUREMENT OF ADHESIVE STRENGTH

A pressure-sensitive adhesive sheet was cut into a size of 20 mm×100 mm, which was contact-bonded with a glass plate having a thickness of 5 mm by reciprocating a roller having a weight of 2 kg once to prepare a test piece. The test piece thus obtained was allowed to stand under the following conditions (1) to (3) , and 180° peel adhesive strength thereof was measured by means of a universal testing machine (rate: 50 mm/min.)

(1) A test piece is allowed to stand in an atmosphere of 23° C. and 65% RH for 20 minutes (initial adhesion).

(2) After conducting the condition (1), the test piece is placed into a dryer having a temperature of 40° C. and kept therein for 7 days, then taken out and allowed to stand in an atmosphere of 23° C. and 65% RH for 20 minutes (adhesion after standing at a high temperature).

(3) After conducting the condition (1), the test piece is placed into a heating humidifier of 40° C. and 92% RH, and kept therein for 7 days, then taken out and allowed to stand in an atmosphere of 23° C. and 65% RH for 20 minutes (adhesion after standing at a high temperature and a high humidity).

TABLE 2-1

Adhesive Strength to Glass Plate (N/20 mm width)

| | Initial Stage | After Standing at High Temp. | After Standing at High Temp. and High Humidity |
|---|---|---|---|
| Example 2-1 | 13.7 | 15.8 | 14.6 |
| Example 2-2 | 12.8 | 15.4 | 13.6 |
| Example 2-3 | 11.5 | 12.9 | 11.1 |
| Example 2-4 | 11.7 | 14.3 | 13.1 |
| Example 2-5 | 11.8 | 13.0 | 13.1 |
| Example 2-6 | 10.2 | 14.6 | 14.5 |
| Example 2-7 | 12.4 | 13.3 | 9.8 |
| Example 2-8 | 8.6 | 8.7 | 7.9 |
| Comparative Example 2-1 | 7.8 | 8.3 | 5.9 |
| Comparative Example 2-2 | 6.8 | 7.1 | 4.0 |
| Comparative Example 2-3 | 8.2 | 8.6 | 2.5 |
| Comparative Example 2-4 | 8.2 | 8.4 | 2.2 |
| Comparative Example 2-5 | 12.5 | 14.3 | 1.8 |
| Comparative Example 2-6 | 8.1 | 8.1 | 1.0 |

It can be seen from the results shown in Table 2-1 that the pressure-sensitive adhesion sheets of Examples 2-1 to 2-8 of the present invention had a high adhesion in an initial stage and after having been allowed to stand at a high temperature and also had a very high adhesion after having been allowed to stand at a high temperature and a high humidity. Thus, it can be seen that they are excellent in moisture and heat resistance. Particularly, the pressure-sensitive adhesion sheets of Examples 2-1 to 2-6 wherein the gel percentages of the copolymer components contained in the acrylic pressure-sensitive adhesives were set at 50% by weight or more are noticeably excellent in moisture resistance and heat resistance compared with those of the pressure-sensitive adhesion sheets of Examples 2-7 and 2-8 having the gel percentage less than $_{50}$% by weight.

The pressure-sensitive adhesion sheet of Example 2-8 shows a case wherein when a copolymer component is obtained according to bulk polymerization method by irradiating ultraviolet rays, an internal crosslinking agent is used in a reduced amount to lower a gel percentage. In this case, the initial adhesion was slightly decreased, but the adhesion after standing at a high temperature and a high humidity was substantially the same as the initial adhesion. Thus, in view of the moisture and heat resistance, a desirable result can be obtained. On the other hand, the pressure-sensitive adhesion sheets of Comparative Examples 2-1 to 2-6 exhibited a drastic decrease in the adhesion after standing at a high temperature and a high humidity, and there was a case causing an insufficient initial adhesion.

As described above, heat-sensitive adhesion sheets excellent in moisture and heat resistance, having a high adhesion to a silicone oxide-containing material such as glass or tile, even under high temperature and high humidity conditions without using a silane coupling agent can be provided by having a construction wherein a layer comprising a specified acrylic pressure-sensitive adhesive is provided on at least one surface of a foamed base material having a specified water absorption according to the first embodiment.

Furthermore, heat-sensitive adhesion sheets excellent in moisture and heat resistance, having a high adhesion to a silicone oxide-containing material such as glass or tile, even under high temperature and high humidity conditions without using a silane coupling agent can be provided by using a plastic film having a specified water vapor permeability as a base material and also having a construction wherein a layer comprising a specified acrylic pressure-sensitive adhesive is provided on at least one surface of this film according to the second embodiment.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesion sheet, which comprises a foamed base material having formed on at least one surface thereof a layer composed of an acrylic pressure-sensitive adhesive comprising a copolymer comprising:

(a) 60 to 94% by weight of an acrylic monomer represented by formula (1a): $CH_2=C(R^1)COOR^2$ wherein $R^1$ is a hydrogen atom or a methyl group; and $R^2$ is an alkyl group having 4 to 14 carbon atoms, (b) 5 to 40% by weight of a (meth) acrylamide represented by formula (2a): $CH_2=C(R^3)CONR^4R^5$ wherein $R^3$ is a hydrogen atom or a methyl group; $R^4$ is a hydrogen atom or an alkyl group; and $R^5$ is an alkyl group or an organic group which is bonded to $R^4$ to form a hetero ring together with a N atom, and (c) 1 to 10% by weight of a monomer having an acidic group, each based on the total content of components a), b) and c), wherein the foamed base material has a water absorption rate less than 15% by weight after having been immersed in warm water having a temperature of 40° C. for 24 hours.

2. The pressure-sensitive adhesion sheet of claim 1, wherein the (meth) acrylamide represented by formula (2a) is selected from the group consisting of N-methylacrylamide, N,N-dimethylacrylamide, N-isopropylacrylamide, N,N-diethyl (meth) acrylamide, N,N-dibutyl (meth) acrylamide, N-(meth) acryloylmorpholine, N-(meth) acryloylpyrrolidone, N-(meth) acryloylpiperidine, N-(meth) acryloylpyrrolidine, and N-(meth) acryloyl-4-peperidone.

3. The pressure-sensitive adhesion sheet of claim 1, wherein the monomer having an acidic group is a carboxyl-containing monomer or a phosphoric group-containing monomer.

4. The pressure-sensitive adhesion sheet of claim 3, wherein the monomer having an acidic group is selected from the group consisting of acrylic acid, methacrylic acid, itaconic acid, maleic acid, crotonic acid, 2-hydroxyethylacryloyl phosphate and 2-hydroxypropylacryloyl phosphate.

* * * * *